(12) United States Patent
Motwani et al.

(10) Patent No.: US 12,032,725 B2
(45) Date of Patent: Jul. 9, 2024

(54) DATA SCRAMBLER FOR PERSISTENT MEMORY

(71) Applicant: Intel Corporation, Santa Clara, CA (US)

(72) Inventors: Ravi H. Motwani, Fremont, CA (US); Santhosh Kumar Vanaparthy, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 16/885,726

(22) Filed: May 28, 2020

(65) Prior Publication Data

US 2020/0293696 A1    Sep. 17, 2020

(51) Int. Cl.
*G06F 21/79* (2013.01)
*G06F 3/06* (2006.01)
*H04L 9/06* (2006.01)

(52) U.S. Cl.
CPC ............ *G06F 21/79* (2013.01); *G06F 3/0623* (2013.01); *G06F 3/0661* (2013.01); *G06F 3/0679* (2013.01); *H04L 9/0631* (2013.01); *H04L 9/0656* (2013.01); *H04L 2209/04* (2013.01)

(58) Field of Classification Search
CPC ...... G06F 21/79; G06F 3/0623; G06F 3/0661; G06F 3/0679; H04L 9/0631; H04L 9/0656; H04L 2209/04
See application file for complete search history.

(56) References Cited

U.S. PATENT DOCUMENTS

2009/0323942 A1* 12/2009 Sharon ............... G11C 16/3427
380/28

* cited by examiner

*Primary Examiner* — Matthew T Henning
(74) *Attorney, Agent, or Firm* — Essential Patents Group, LLP (57) ABSTRACT

Techniques and mechanisms to provide one or more substrates, and logic coupled to the one or more substrates. In an embodiment, the logic is to generate a pseudo-random sequence of bits, and to permute one or more bits of binary unscrambled data. In another embodiment, the logic is further to generate scrambled data based on an exclusive-or operation between the pseudo-random sequence of bits and the permuted data.

18 Claims, 10 Drawing Sheets

DATA SCRAMBLER FOR PERSISTENT MEMORY

BACKGROUND

Data scramblers are useful for a wide range of technology applications. For telecommunications, a scrambler (e.g., sometimes also referred to as a randomizer) may manipulate the data stream before transmitting. The manipulations are then reversed by a descrambler at the receiving side. For memory applications, the scrambler may scramble the data before writing the data to memory. The stored data may then be descrambled when reading the data from the memory. Some scramblers may utilize a pseudo-random binary sequence to scramble the data. In some applications, the scrambler may utilize a linear feedback shift register (LFSR) to provide the pseudo-random binary sequence.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
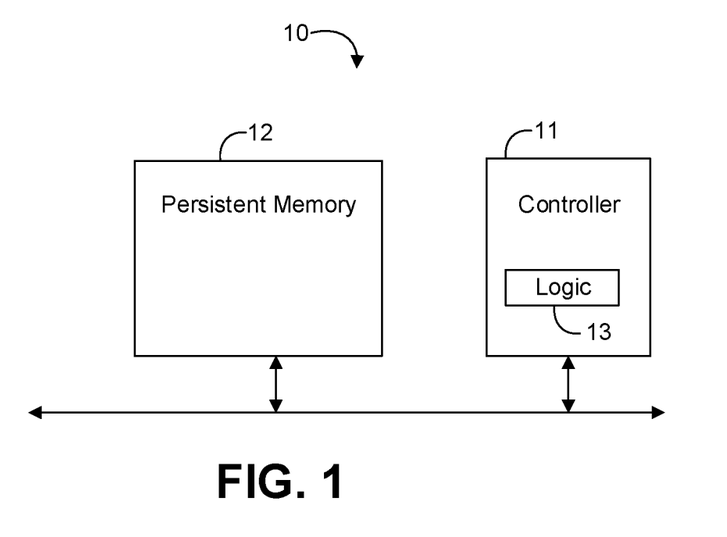
FIG. 1 is a block diagram of an example of an electronic system according to an embodiment.

With reference to FIG. 1, an embodiment of an electronic system 10 may include persistent memory 12, and a controller 11 communicatively coupled to the persistent memory 12. The controller 11 may include logic 13 to determine a first seed value, determine a mask pattern based on the first seed value, generate a pseudo-random first sequence of bits based on the first seed value, generate a second sequence of bits based on an exclusive-or operation between the first sequence of bits and the mask pattern, and generate scrambled data to store in the persistent memory 12 based on an exclusive-or operation between the second sequence of bits and unscrambled data. For example, the logic 13 may include a linear feedback shift register (LFSR) to generate the pseudo-random first sequence of bits based on the first seed value. In some embodiments, the logic 13 may be further configured to complement the first seed value to provide a complemented seed value, and join (e.g., append, prepend, concatenate, insert, etc.) the complemented seed value and the first seed value to provide a binary mask pattern for the mask pattern with a balanced number of binary zero-value bits and binary one-value bits. For example, the logic 13 may also be configured to permute one or more bits of the binary mask pattern. Some embodiments of the logic 13 may be configured to determine the first seed value based on one or more of metadata and address information associated with the unscrambled data.

In some embodiments, the logic 13 may be configured to determine a second seed value based on a non-linear transformation of the first seed value, and generate the pseudo-random first sequence of bits based on the second seed value. Additionally, or alternatively, the logic 13 may be configured to permute one or more bits of the unscrambled data, and generate the scrambled data to store in the persistent memory 12 based on an exclusive-or operation between the second sequence of bits and the permuted unscrambled data. In any of the embodiments herein, the persistent memory 12 may comprise three-dimensional (3D) crosspoint media.

Embodiments of each of the above controller 11, persistent memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the persistent memory 12, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent memory 12, other persistent memory, or other system memory may store a set of instructions which when executed by the controller 11 cause the system 10 to implement one or more components, features, or aspects of the system 10 (e.g., the logic 13, determining the first seed value, determine the mask pattern based on the first seed value, generating the pseudo-random first sequence of bits based on the first seed value, generating the second sequence of bits based on an exclusive-or operation between the first sequence of bits and the mask pattern, generating the scrambled data, etc.).

Figure 2:
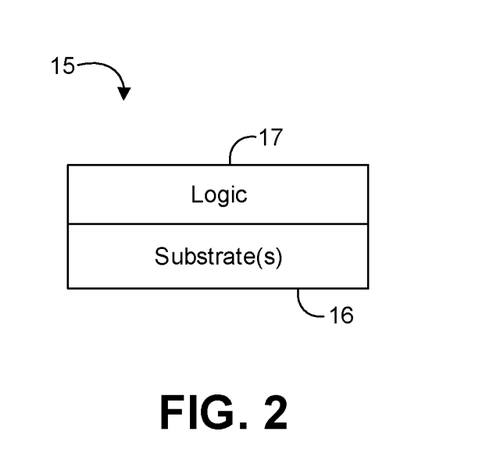
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to generate a pseudo-random sequence of bits, permute one or more bits of binary unscrambled data, and generate scrambled data based on an exclusive-or operation between the pseudo-random sequence of bits and the permuted data. In some embodiments, the logic 17 may be configured to permute the one or more bits of the binary unscrambled data as a function of the binary unscrambled data. For example, the function may be permutation invariant.

In some embodiments, the logic 17 may be configured to generate the pseudo-random sequence of bits based on a seed value and a balanced mask pattern, and/or to apply a non-linear transformation to the seed value. In some applications, the logic 17 may be configured to permute the one or more bits of the binary unscrambled data based on a permutation invariant function (e.g., a Hamming weight) of the binary unscrambled data, and write the scrambled data to a persistent memory (e.g., which may include 3D crosspoint media).

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3:
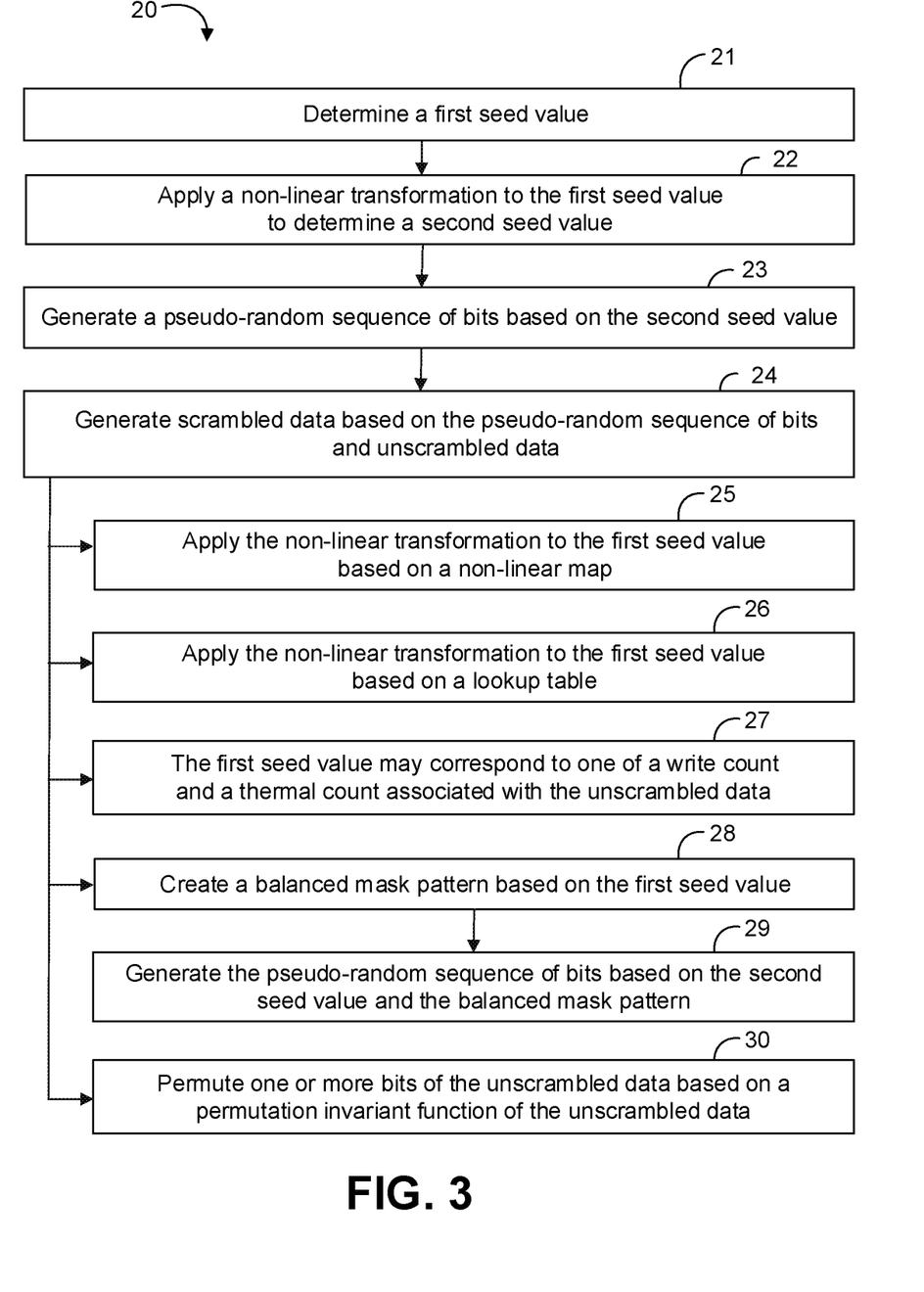
FIG. 3 is a flowchart of an example of a method of scrambling data according to an embodiment.

Turning now to FIG. 3, an embodiment of a method 20 of scrambling data may include determining a first seed value at box 21, applying a non-linear transformation to the first seed value to determine a second seed value at box 22, generating a pseudo-random sequence of bits based on the second seed value at box 23, and generating scrambled data based on the pseudo-random sequence of bits and unscrambled data at box 24. For example, the method 20 may include applying the non-linear transformation to the first seed value based on a non-linear map at box 25, and/or applying the non-linear transformation to the first seed value based on a lookup table at box 26. In some embodiment, the first seed value may correspond to one of a write count and a thermal count associated with the unscrambled data at box 27. Additionally, or alternatively, some embodiments of the method 20 may include creating a balanced mask pattern based on the first seed value at box 28, generating the pseudo-random sequence of bits based on the second seed value and the balanced mask pattern at box 29, and/or permuting one or more bits of the unscrambled data based on a permutation invariant function of the unscrambled data at box 30.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for an improved or optimized data scrambler, which may be particularly useful as part of a 3D crosspoint memory controller. The 3D crosspoint based controller may support write in place (WIP) technology. To change the value of data stored on the media, the 3D crosspoint controllers may perform a read modify write (RMW) operation of the data. For 3D crosspoint based media, the controller takes into account additional requirements to ensure that the new data satisfies certain constraints with respect to the existing data. For example, 3D crosspoint media may encounter a high raw bit error rate (RBER) if the cells are programmed repeatedly to the same state for more than a certain number of writes. Accordingly, even if the same user data is written to the same address repeatedly, the media benefits if the bits flip at least every few writes. Ensuring that the bits flip over the course of a given number of writes may be referred to as having no stuck cells. Another constraint includes that there may be power and endurance issues if too many bits are flipped in an RMW operation. Another problem is that a refresh operation may lead to writing the same data to the same address and without Advanced Encryption Standard (AES) being applied, malicious users (e.g., hackers) may anticipate the writes and handcraft data patterns which can potentially lead to all bits flipped in a RMW operation, which may cause a media fail (e.g., this may be referred to as data hacking).

Some other memory systems may utilize a LFSR to scramble data, but do not guarantee that there are no stuck cells either in the data payload or the ECC parity when the same data is written to the same address. Some other memory systems that utilize a LFSR may not ensure that there are no more than 70% set cells or no less than 30% set cells (e.g., or other 3D crosspoint technology constraints). Also, when data encryption such as AES is not present or enabled, some conventional LFSR implementations are not resilient to data hacking. Some embodiments may advantageously overcome one or more of the foregoing problems.

Some embodiments may provide a scrambler that includes a LFSR together with one or more additional features to improve the security, resiliency, and/or other operational aspects of 3D crosspoint memory media. In addition to the output of the LFSR, for example, some embodiments may start with a known seed or random bits in the system, complement these bits, and append permuted copies of this pattern to generate a random large balanced sequence. In addition to these operations, some embodiments may also perform selected XOR operations to ensure that there are no stuck cells in the data or the parity portion of the 3D crosspoint memory media. To ensure that hackers do not generate data patterns which cause high numbers of flips in the RMW pattern, for example, some embodiments may additionally or alternatively use permutations which are a function of the data pattern, thereby making the write pattern more robust to data hacking.

Figure 4:
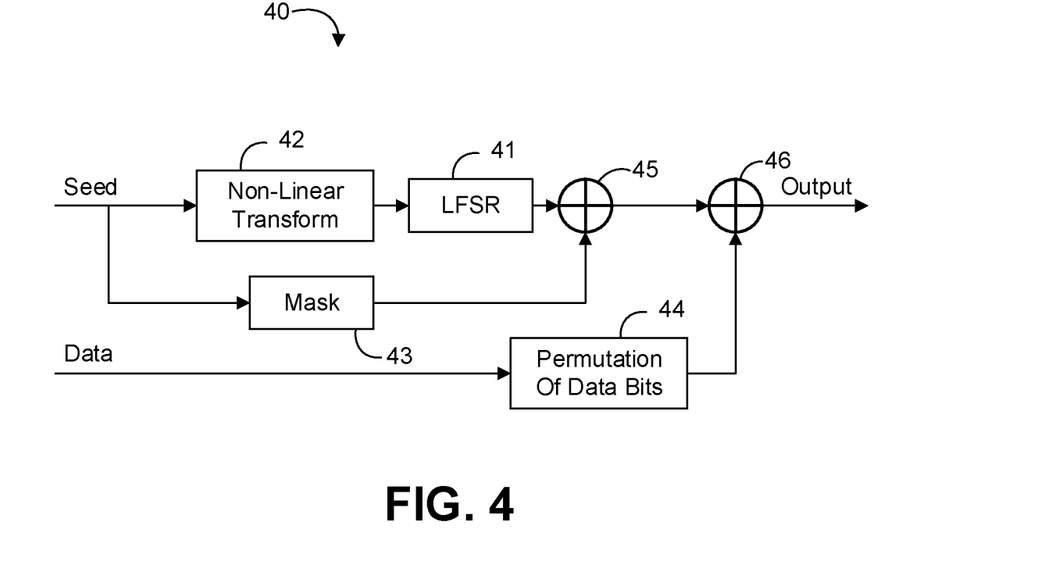
FIG. 4 is a block diagram of an example of a data scrambler according to an embodiment.
Figure 5A:
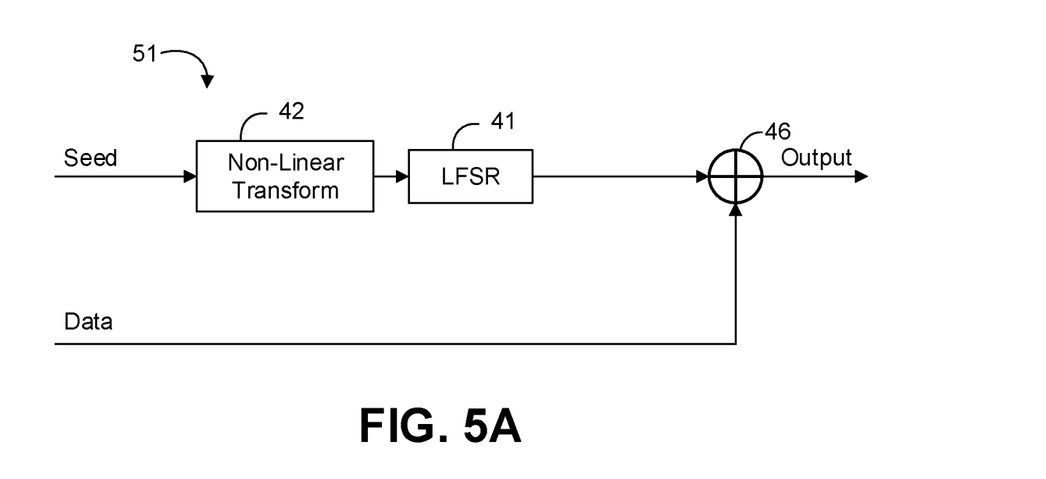
FIGS. 5A to 5F are block diagrams of respective other examples of a data scrambler according to embodiments.
Figure 5B:
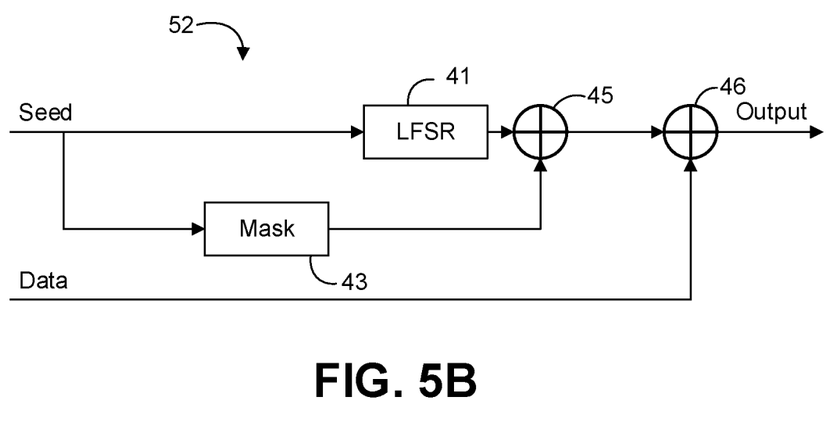
Figure 5C:
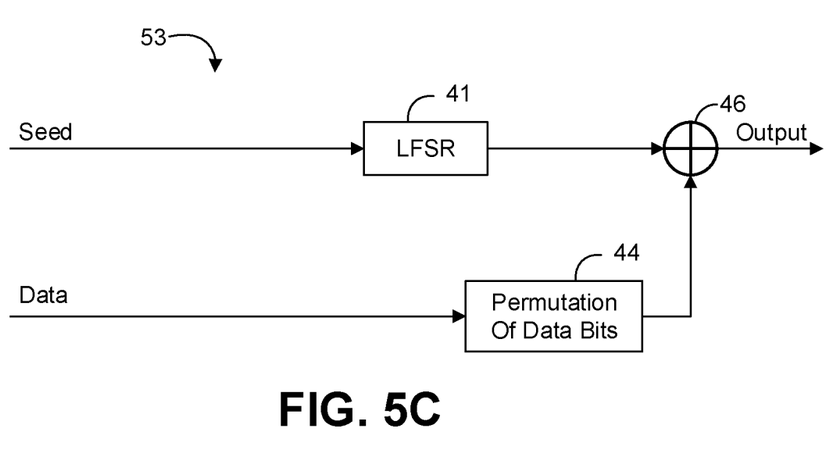
Figure 5D:
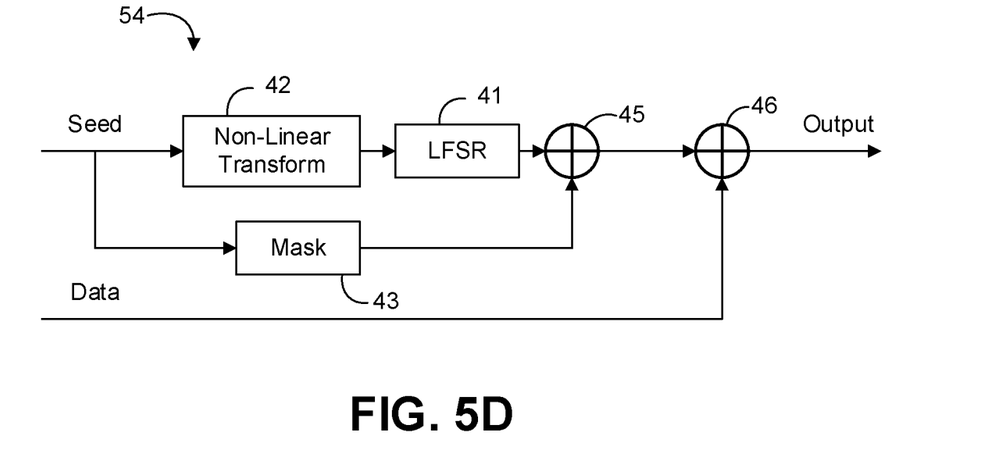
Figure 5E:
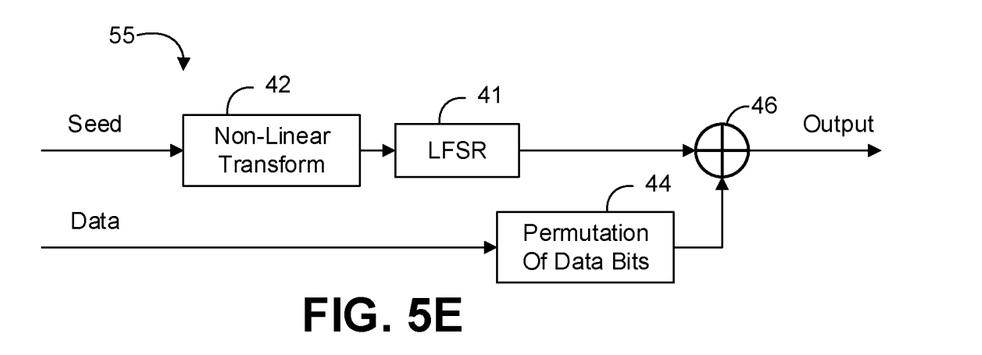
Figure 5F:
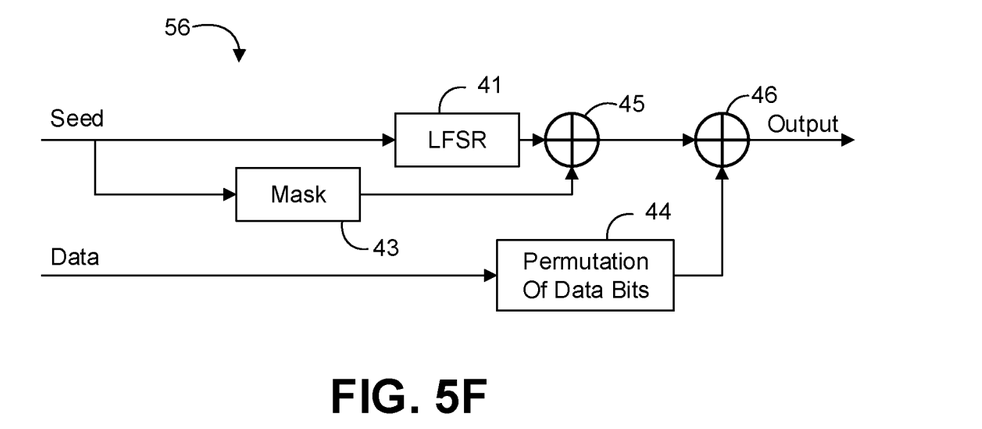
Figure 6A:
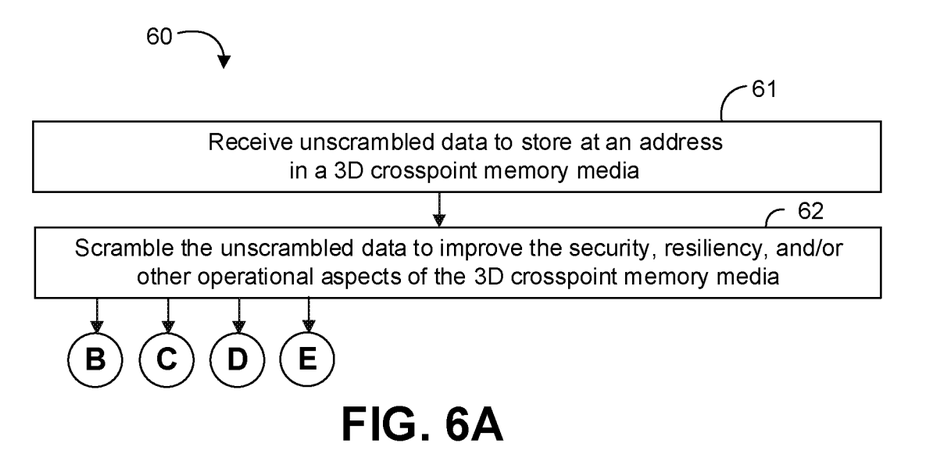
FIGS. 6A to 6E are flowcharts of an example of a method of controlling memory according to an embodiment.
Figure 6B:
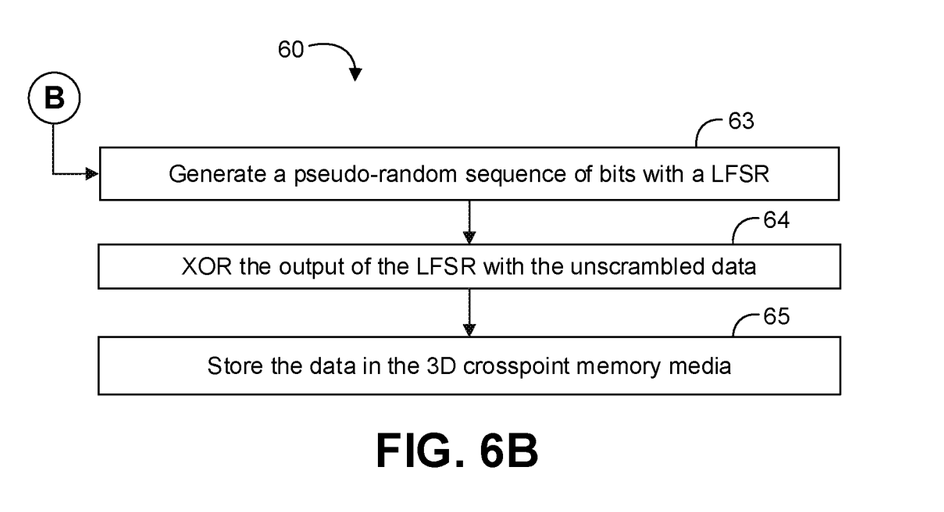
Figure 6C:
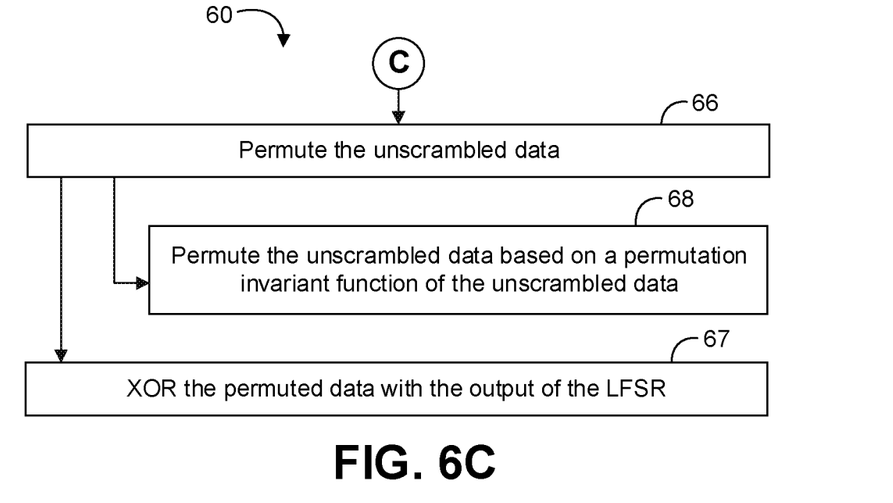
Figure 6D:
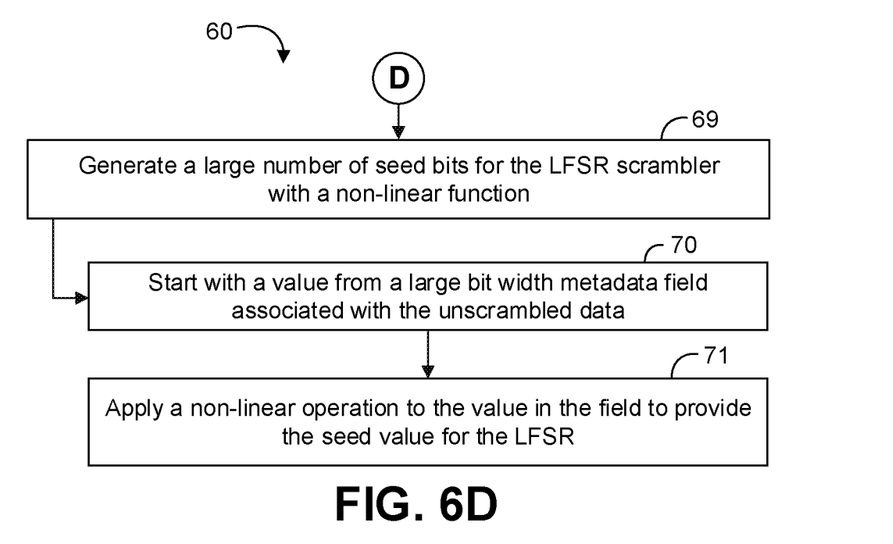
Figure 6E:
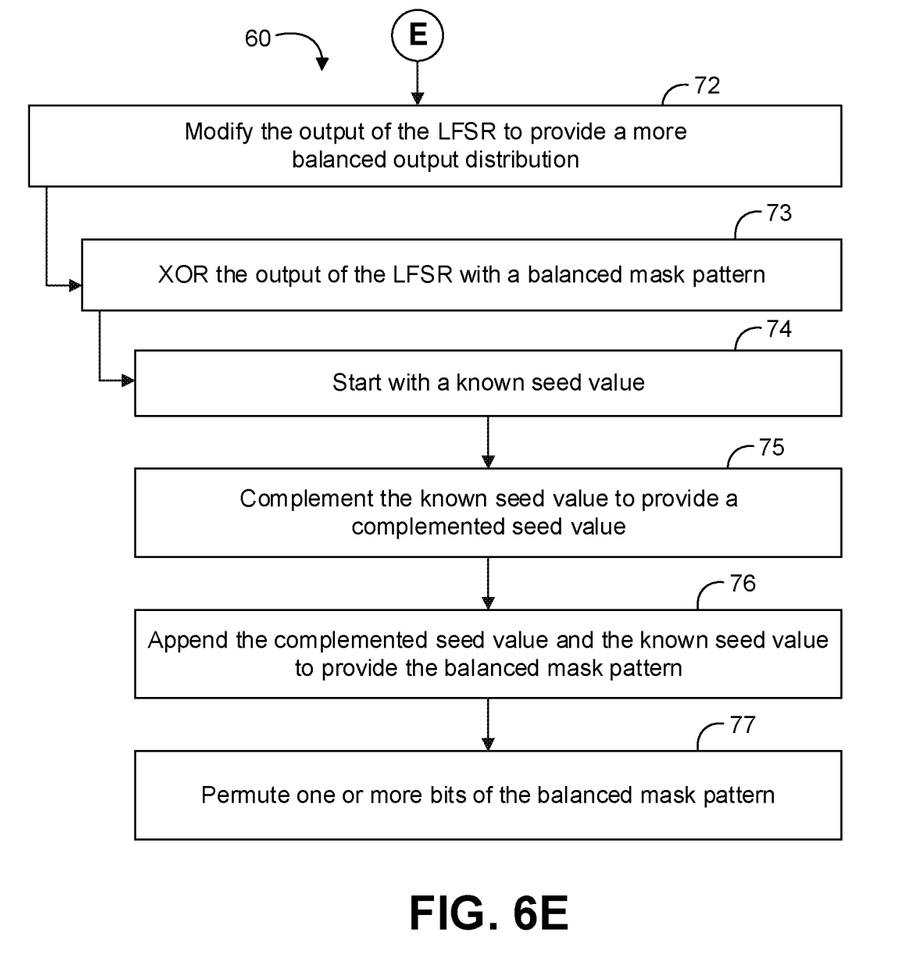

Turning now to FIG. 4, an embodiment of a data scrambler 40 may include a LFSR 41, a non-linear transform block 42, a mask block 43, and a permutation of data bits block 44, first XOR logic 45, and second XOR logic 46, coupled as shown. For example, the LFSR 41 may be implemented with a degree 16 polynomial. The LFSR 41 may be configured to generate a pseudo-random sequence of bits, which needs to be reversible when the data is read from the media. Accordingly, the initial state of the LFSR 41 is seeded with a source of randomness that is known both at the write path and the read path. For example, the source of randomness may include various parts of the meta information such as write count bits, thermal count bits, logical address bits, pseudo-random bits that are stored separately in the meta data, etc. The source of randomness may collectively be referred to as seed bits to the LFSR 41.

The respective blocks 42, 43, and 44 each provide advantages for different applications which may be independent from each other. With reference to FIGS. 5A to 5F, respective embodiments of data scramblers 51 to 56 show example combinations of the various blocks 42, 43, and 44.

Balanced Output Distribution Examples

For 3D crosspoint media, even for fixed user data patterns, it may be beneficial to generate patterns whose weight has not just binomial distribution, but also to generate data with a balanced number of zeros (0s) and ones (1s) (e.g., media data which has 50% cells programmed to set and 50% cells programmed to reset state per partition may be preferred). To accomplish this, some embodiments may employ two operations including a complement operation and a permute operation. Complementing the seed pattern and appending the complemented seed pattern to the original seed sequence advantageously creates a mask pattern that balances the 0s and 1s. Permuting the created mask pattern creates a variation that advantageously may be resilient to different constant data written to the media.

In one non-limiting example, three seed bits may begin with: $[S_0\ S_1\ S_2]$. For example, these seed bits may be functions of the logical address bits, write count bits, thermal count bits, exclusive random bits needed for the initialization of the LFSR, etc. To create a balanced output over 12 bits, some embodiments may perform the following operations:

1) First, complement the seed pattern and append the result to the seed pattern. This results in a balanced mask pattern:
$[S_0\ S_1\ S_2\ \overline{S_0}\ \overline{S_1}\ \overline{S_2}]$,
where $\overline{S_0}, \overline{S_1}, \overline{S_2}$, are complements of the bits $S_0, S_1, S_2$, respectively
2) Repeat the initial mask pattern to obtain a 12-bit wide mask pattern (still balanced):
$[S_0\ S_1\ S_2\ \overline{S_0}\ \overline{S_1}\ \overline{S_2}\ S_0\ S_1\ S_2\ \overline{S_0}\ \overline{S_1}\ \overline{S_2}]$
3) Permute the mask pattern to obtain a final 12-bit wide and balanced mask pattern:
$[S_0\ \overline{S_2}\ S_1\ \overline{S_1}\ S_2\ \overline{S_0}\ \overline{S_1}\ S_2\ \overline{S_0}\ S_1\ \overline{S_0}\ S_2]$ When the mask block 42 is utilized, the data scrambler may then XOR the output of the LFSR 41 with the balanced mask pattern output from the mask block 42 to get a balanced, scrambled output from the XOR logic 45 (e.g., which may then be XORed with the data before writing to the media). Some embodiments may optionally provide a flag or other technology to enable/disable the XOR masking patterns. Advantageously, embodiments with the mask block 42 enabled may closely follow a binomial distribution or a more desirable balanced distribution.

Stuck Cells Removal Examples

When the same user data is written to the same address repeatedly, the media benefits if the bits flip at least every few writes. However, the random component of the seed bits to the LFSR (e.g., that may only be a function of the address bits) may not change when writing to the same address. Moreover, if the random component in the seed bits to the LFSR is only a few to several bits, then only a limited number of unique patterns may be written repeatedly to the media (e.g., only 128 unique patterns in the case of 7 seed bits). With the limited number of unique patterns, when the same data is written to the same address, it is possible to have certain bit positions which remain at either set or reset across all possible outputs. The 3D crosspoint media exposure to continuous set programs leads to those cells reading as reset if they never flip for repeated writes. In order to alleviate this issue and remove stuck bits, some embodiments may tweak the scrambler output. For example, some embodiments explicitly XOR the known stuck cell locations with a varying component in the seed.

Resilience to Data Hacking Examples

Between two successive writes to the same address, the RMW pattern ideally includes 50% 0s and 50% 1s. But it may be possible for a malicious user to generate data patterns so that the RMW pattern has all 1s in its output. If the number of 1s in the RMW pattern is too high, it can potentially lead to power issues and programming fails, causing a significant performance degradation of the drive.

To prevent such malicious attacks and ensure that the RMW pattern does not have more than a given number of bits, some embodiments may perform a permutation of the data before XORing the data with the output of the LFSR 41. If the permutation is a static operation that is independent of the data, then it may be easier for the malicious user to recognize this and create adversarial data patterns that have high number of is in the RMW pattern. Advantageously, some embodiments make the permutation a function of the data, such that the user does not have complete control of the output that is written to the media and thereby providing resilience to the data hacking. In some embodiments, the permutation of the user data may be made to be a function of its Hamming weight. Because the Hamming weight is invariant to the permutation operation, the permutation chosen at the write path may be inverted simply by re-calculating the Hamming weight at the read path for descrambling.

Large Seed Bit Generation with Non-Linear Functions Examples

The randomness in the LFSR output and resilience to the data hacking can be improved significantly if the number of the seed bits is sufficiently large. A problem is that there may be limited space in the meta data to store a large number of pseudo-random bits to initialize the LFSR (e.g., the metadata field for a pseudo-random seed value may be 7 bits or less). Some metadata fields (e.g., write count, thermal count, etc.) may have more bits but may not exhibit sufficient randomness for the seed value. For example, the write count bits and thermal count bits are not random at a fixed address (e.g., they either increment by 1 or in the case of thermal counts they increment by some fixed value). To address this issue, some embodiments may utilize an invertible non-linear map of the write count and/or the thermal count bits, such that fixed increments in the write count bits are mapped to an arbitrary change in the output bits. Advantageously, the number of seed bits may be increased from a smaller number of bits allocated in the metadata for a pseudo-random seed to a larger number of seed bits, without increasing any meta data sizes.

Advantageously, some embodiments may provide efficient non-linear functions suitable for hardware implementation via partitions. For example, with twenty-one (21) write count (WC) bits WC[20:0], the last 7 bits of the write count bits may first be XORed with the other bits as follows (e.g., where the first seed value from the write count metadata field is transformed to a second seed value, seed write count (SWC)):

SWC[20:0]={WC[20:14] XOR WC[6:0], WC[13:7] XOR WC[6:0], WC[6:0]}

The least significant write count bits may change much more frequently than the most significant bits. Over successive writes, the foregoing non-linear transformation may create a larger variation in the most significant bits. The foregoing mapping is invertible, such that the modified 21 bits can then be passed through different 7-bit non-linear (NL) functions (NL7_1, NL7_2, NL7_3) that map 7 input bits to 7 output bits. For example, the invertible map may be configured such that successive increments in the 7-bit input will lead to large changes in the output. The new write count field may then be of the form:

NLSW[20:0]={NL7_1(WC[20:14]+WC[6:0]), NL7_2 (WC[13:7]+WC[6:0]), NL7_3(WC[6:0])}

The inputs to the non-linear functions may also either be permuted or interleaved to cause increased variation in the output bits. The 21 bits of NLSWC may then be used as a large pseudo-random initialization to the LFSR. In some embodiments, the non-linear transform may be implemented via a lookup table. For example, the lookup table may be stored in SRAMs, a series of flip-flops, etc.

Turning now to FIGS. 6A to 6E, an embodiment of a method 60 of controlling memory may include receiving unscrambled data to store at an address in a 3D crosspoint memory media at box 61, and scrambling the unscrambled data to improve the security, resiliency, and/or other operational aspects of the 3D crosspoint memory media at box 62. To meet media constraints, for example, some embodiments of the method 60 may include generating a pseudo-random sequence of bits with a LFSR at box 63, and XORing the output of the LFSR with the unscrambled data at box 64 prior to storing the data in the 3D crosspoint memory media at box 65.

To improve security and/or resiliency to data hacking, for example, some embodiments of the method 60 may include permuting the unscrambled data at box 66, prior to XORing the permuted data with the output of the LFSR at box 67. For example, the method 60 may include permuting the unscrambled data based on a permutation invariant function of the unscrambled data at box 68, such as a function of the unscrambled data's Hamming weight.

To further improve security and/or resiliency to data hacking, for example, some embodiments of the method 60 may additionally or alternatively include generating a large number of seed bits for the LFSR scrambler with a non-linear function at box 69. For example, the method 60 may include starting with a value from a large bit width metadata field associated with the unscrambled data at box 70 (e.g., such as write count, thermal count, etc.), and applying a non-linear operation to the value in the field to provide the seed value for the LFSR at box 71.

To improve an operational aspect of the 3D crosspoint memory media, for example, some embodiments of the method 60 may include modifying the output of the LFSR to provide a more balanced output distribution at box 72. For example, the method 60 may include XORing the output of the LFSR with a balanced mask pattern at box 73, prior to scrambling the unscrambled data. Some embodiments of the method 60 may include starting with a known seed value at box 74 (e.g., derived from metadata or the address associated with the unscrambled data), complementing the known seed value to provide a complemented seed value at box 75 (e.g., with an equal number of 0s and 1s between the know seed value and its complement), and appending the complemented seed value and the known seed value to provide the balanced mask pattern at box 76 (e.g., or otherwise joining/concatenating the two bit strings). To reduce or eliminate stuck cells, for example, some embodiments of the method 60 may also include permuting one or more bits of the balanced mask pattern at box 77 (e.g., changing the arrangement of the balanced mask pattern to target known stuck cell locations with a more variable component of the known seed value).

Embodiments of the method 60 may be implemented in a system, apparatus, computer, device, etc., for example, such as those described herein. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 60 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 60 may be implemented on a computer readable medium. Embodiments or portions of the method 60 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)). Although embodiments of a data scrambler have been described in connection with persistent memory technology, those skilled in the art will appreciate that embodiments of other data scramblers may be readily adapted to other technologies, such as telecommunication, with suitable modifications corresponding to constraints relevant to such technologies.

Figure 7:
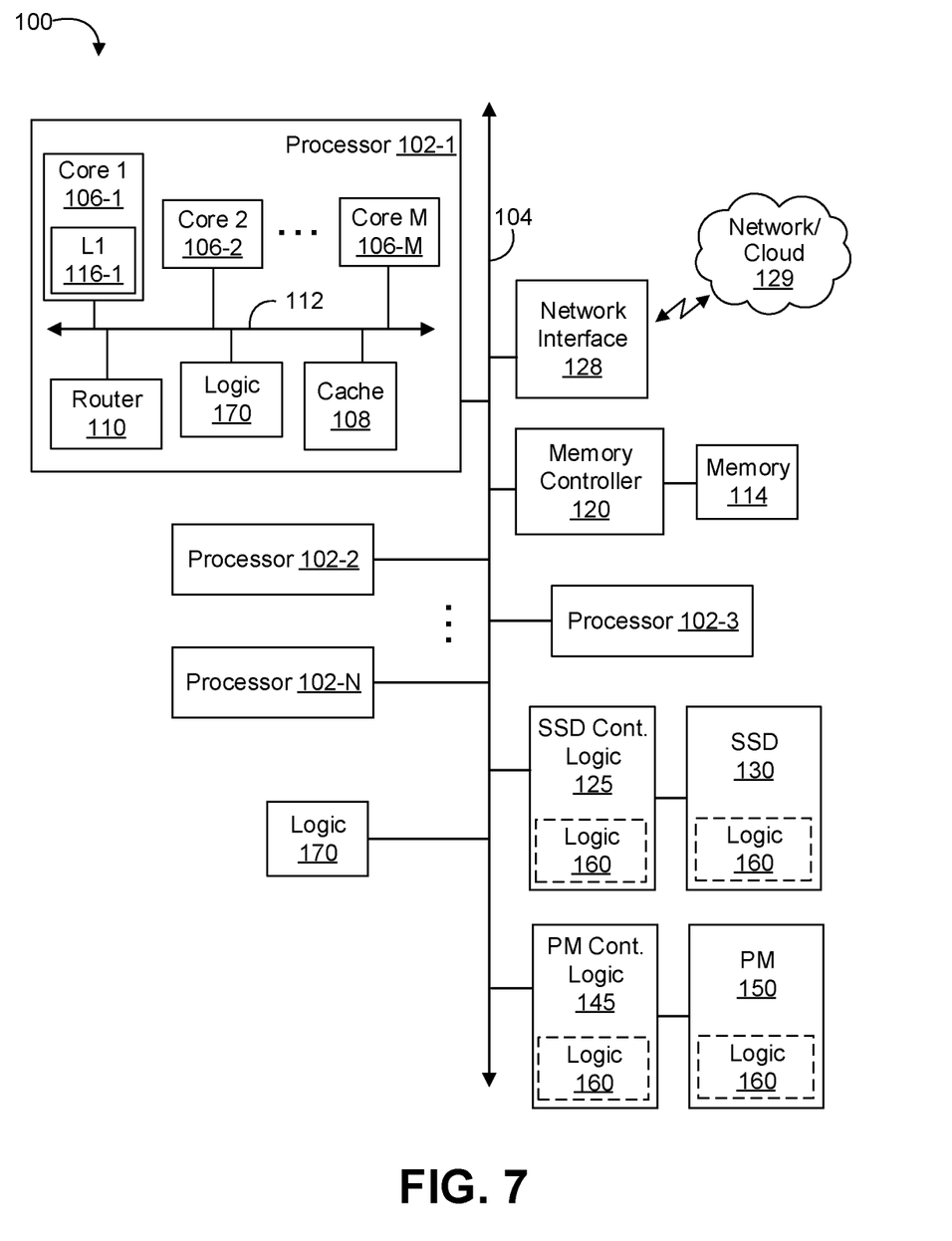
FIG. 7 is a block diagram of an example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a solid state drive (SSD) 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic for the SSD 130 or provided on a same integrated circuit (IC) device in various embodiments (e.g., on the same circuit board device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

System 100 may also include a persistent memory (PM) device such as a PM 150 coupled to the interconnect 104 via PM controller logic 145. Hence, logic 145 may control access by various components of system 100 to the PM 150. Furthermore, even though logic 145 is shown to be directly coupled to the interconnection 104 in FIG. 7, logic 145 can alternatively communicate via a memory bus/interconnect (such as a DDR4 interface, etc.) with one or more other components of system 100 (for example where the memory bus is coupled to interconnect 104 via some other logic like a bus bridge, chipset, etc.) Additionally, logic 145 may be incorporated into memory controller logic (such as those discussed with reference to FIG. 8) or provided on a same integrated circuit (IC) device in various embodiments (e.g., on the same circuit board device as the PM 150 or in the same enclosure as the PM 150).

Furthermore, logic 145 and/or PM 150 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, PM 150, memory bus, logic 145, logic 160, logic 170, etc., to sense variations in various factors affecting power/thermal behavior of the system/platform, such as temperature, operating frequency, operating voltage, power consumption, and/or inter-core communication activity, etc.

Figure 8:
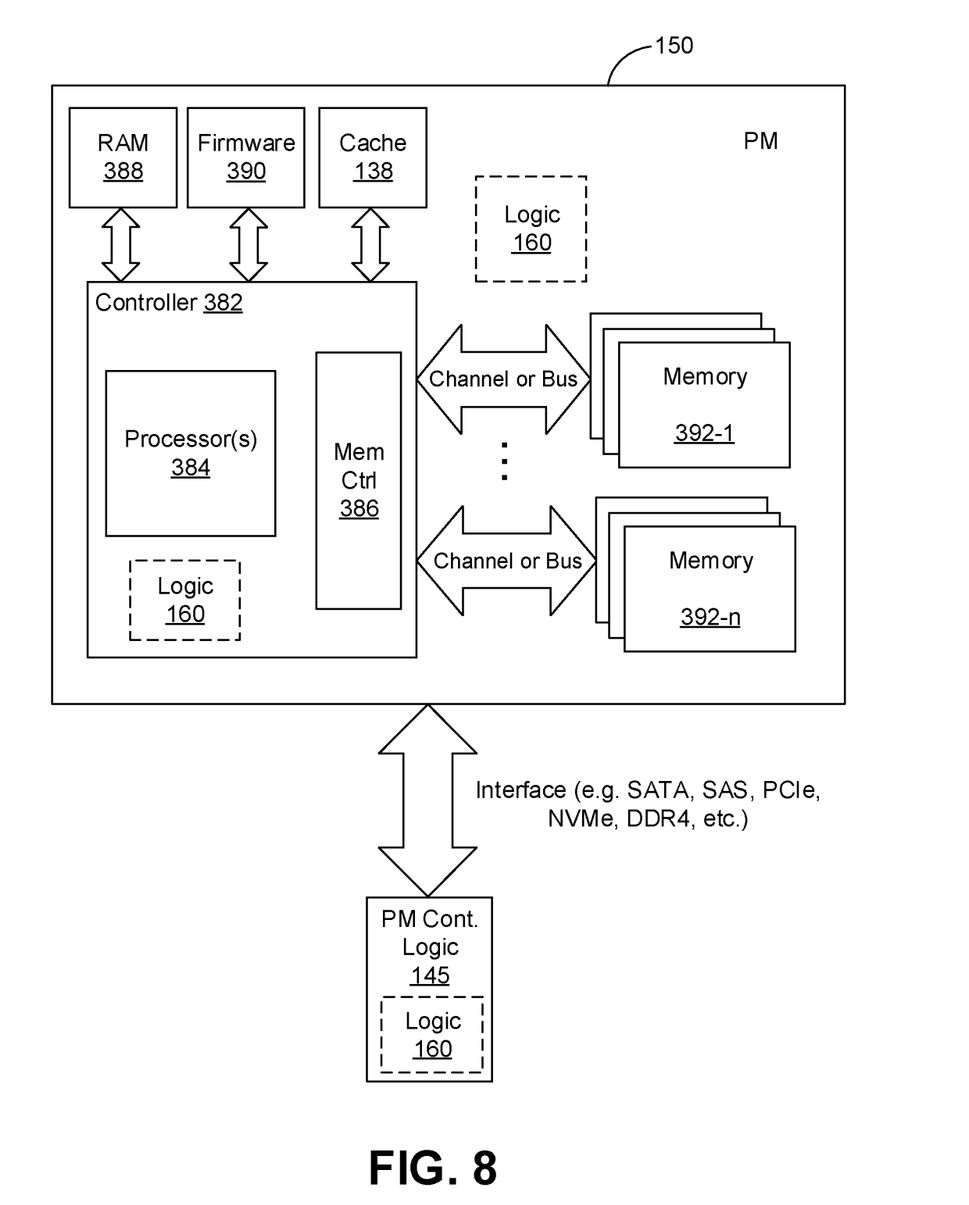
FIG. 8 is a block diagram of an example of a persistent memory (PM) device according to an embodiment.

FIG. 8 illustrates a block diagram of various components of the PM 150, according to an embodiment. As illustrated in FIG. 8, logic 160 may be located in various locations such as inside the PM 150 or controller 382, etc., and may include similar technology as discussed in connection with FIG. 7. The PM 150 includes a controller 382 (which in turn includes one or more processor cores or processors 384 and memory controller logic 386), cache 138, RAM 388, firmware storage 390, and one or more memory devices 392-1 to 392-N (collectively memory 392, which may include 3D crosspoint, or other types of non-volatile memory). The memory 392 is coupled to the memory controller logic 386 via one or more memory channels or busses. Also, PM 150 communicates with logic 145 via an interface (such as a DDR4, etc., interface). Processors 384 and/or controller 382 may compress/decompress data written to or read from memory devices 392-1 to 392-N.

As illustrated in FIGS. 7 and 8, the PM 150 may include logic 160, which may be in the same enclosure as the PM 150 and/or fully integrated on a printed circuit board (PCB) of the PM 150. The system 100 may include further logic 170 outside of the PM 150. One or more of the features/aspects/operations discussed with reference to FIGS. 1-6E may be performed by one or more of the components of FIGS. 7 and/or 8. Also, one or more of the features/aspects/operations of FIGS. 1-6E may be programmed into the firmware 390. Further, PM controller logic 145 may also include logic 160. Advantageously, the logic 160 and/or logic 170 may include technology to implement one or more aspects of the system 10 (FIG. 1), the apparatus 15 (FIG. 2), the method 20 (FIG. 3), the data scrambler 40 (FIG. 4), any of the data scramblers 51 to 56 (FIGS. 5A to 5F), the method 60 (FIGS. 6A to 6E), and/or any of the features discussed herein. For example, the logic 170 may include technology to implement the host device/computer system/agent aspects of the various embodiments described herein while the logic 160 may include technology to implement the data scrambler aspects of the various embodiments described herein.

In some embodiments, the SSD 130 may include INTEL OPTANE SSD technology, and may also include appropriately configured logic 160. The SSD 130 may communicate with logic 125 via an interface (such as a SATA, PCIe, NVMe, etc., interface).

In particular, the logic 160 may be configured to determine a first seed value, determine a mask pattern based on the first seed value, generate a pseudo-random first sequence of bits based on the first seed value, generate a second sequence of bits based on an exclusive-or operation between the first sequence of bits and the mask pattern, and generate scrambled data to store in the PM 150 based on an exclusive-or operation between the second sequence of bits and unscrambled data. For example, the logic 160 may include a LFSR to generate the pseudo-random first sequence of bits based on the first seed value. In some embodiments, the logic 160 may be further configured to complement the first seed value to provide a complemented seed value, and join (e.g., append, prepend, concatenate, insert, etc.) the complemented seed value and the first seed value to provide a binary mask pattern for the mask pattern with a balanced number of binary zero-value bits and binary one-value bits. For example, the logic 160 may also be configured to permute one or more bits of the binary mask pattern. Some embodiments of the logic 160 may be configured to determine the first seed value based on one or more of metadata and address information associated with the unscrambled data.

In some embodiments, the logic 160 may be configured to determine a second seed value based on a non-linear transformation of the first seed value, and generate the pseudo-random first sequence of bits based on the second seed value. Additionally, or alternatively, the logic 160 may be configured to permute one or more bits of the unscrambled data, and generate the scrambled data to store in the PM 150 based on an exclusive-or operation between the second sequence of bits and the permuted unscrambled data.

In other embodiments, the PM 150 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the PM 150 may include two or more types of storage media. For example, the bulk of the persistent memory media may be faster, smaller granularity accessible (e.g., byte-addressable) 3D crosspoint memory media such as INTEL OPTANE persistent memory technology media, together with some lower cost NAND media. The PM 150 may alternatively, or additionally, include persistent volatile memory (e.g., battery or capacitor backed-up DRAM or SRAM). For example, the PM 150 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile media. The capacitors may act as backup batteries for the persistent volatile memory. As shown in FIGS. 7 and 8, features or aspects of the logic 160 and/or the logic 170 may be distributed throughout the system 100, and/or co-located/integrated with various components of the system 100.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   logic coupled to the one or more substrates, the logic to:
      determine a first seed value,
      determine a mask pattern based on the first seed value,
      generate a pseudo-random first sequence of bits based on the first seed value,
      generate a second sequence of bits based on an exclusive-or operation between the pseudo-random first sequence of bits and the mask pattern,
      generate scrambled data based on an exclusive-or operation between the second sequence of bits and unscrambled data,
      complement the first seed value to provide a complemented seed value, and
      join the complemented seed value and the first seed value to provide a binary mask pattern for the mask pattern with a balanced number of binary zero-value bits and binary one-value bits.

2. The apparatus of claim 1, wherein the logic is further to:
   permute one or more bits of the binary mask pattern.

3. The apparatus of claim 1, wherein the logic comprises a linear feedback shift register to generate the pseudo-random first sequence of bits based on the first seed value.

4. The apparatus of claim 1, wherein the logic is further to:
   determine the first seed value based on one or more of metadata and address information associated with the unscrambled data.

5. The apparatus of claim 1, wherein the logic is further to:
   permute one or more bits of the unscrambled data; and
   generate the scrambled data based on an exclusive-or operation between the second sequence of bits and the permuted one or more bits of the unscrambled data; and
   write the scrambled data to a persistent memory.

6. The apparatus of claim 5, wherein the persistent memory comprises three dimensional crosspoint media.

7. An electronic system, comprising:
   persistent memory; and
   a controller communicatively coupled to the persistent memory, the controller including logic to:
      determine a first seed value,
      determine a mask pattern based on the first seed value,
      generate a pseudo-random first sequence of bits based on the first seed value, generate a second sequence of bits based on an exclusive-or operation between the pseudo-random first sequence of bits and the mask pattern, generate scrambled data to store in the persistent memory based on an exclusive-or operation between the second sequence of bits and unscrambled data, complement the first seed value to provide a complemented seed value, and join the complemented seed value and the first seed value to provide a binary mask pattern for the mask pattern with a balanced number of binary zero-value bits and binary one-value bits.

8. The electronic system of claim 7, wherein the logic is further to:

permute one or more bits of the binary mask pattern.

9. The electronic system of claim 7, wherein the logic comprises a linear feedback shift register to generate the pseudo-random first sequence of bits based on the first seed value.

10. The electronic system of claim 7, wherein the logic is further to:

determine the first seed value based on one or more of metadata and address information associated with the unscrambled data.

11. The electronic system of claim 7, wherein the logic is further to:

determine a second seed value based on a non-linear transformation of the first seed value; and generate the pseudo-random first sequence of bits based on the second seed value.

12. The electronic system of claim 11, wherein the logic is further to:

permute one or more bits of the unscrambled data; and generate the scrambled data to store in the persistent memory based on an exclusive-or operation between the second sequence of bits and the permuted one or more bits of the unscrambled data.

13. The electronic system of claim 7, wherein the persistent memory comprises three-dimensional crosspoint media.

14. A method of scrambling data, comprising:

determining a first seed value;

determining a mask pattern based on the first seed value;

generating a pseudo-random first sequence of bits based on the first seed value;

generating a second sequence of bits based on an exclusive-or operation between the pseudo-random first sequence of bits and the mask pattern;

generating scrambled data based on an exclusive-or operation between the second sequence of bits and unscrambled data;

complementing the first seed value to provide a complemented seed value; and joining the complemented seed value and the first seed value to provide a binary mask pattern for the mask pattern with a balanced number of binary zero-value bits and binary one-value bits.

15. The method of claim 14, further comprising:

permuting one or more bits of the binary mask pattern.

16. The method of claim 14, further comprising:

determining the first seed value based on one or more of metadata and address information associated with the unscrambled data.

17. The method of claim 14, further comprising:

determining a second seed value based on a non-linear transformation of the first seed value; and generating the pseudo-random first sequence of bits based on the second seed value.

18. The method of claim 14, further comprising:

permuting one or more bits of the unscrambled data; and generate the scrambled data to store in a persistent memory based on an exclusive-or operation between the second sequence of bits and the permuted one or more bits of the unscrambled data.

\* \* \* \* \*